July 28, 1964  I. D. PRESS  3,142,498
NON-SEPARABLE SWIVEL JOINT ASSEMBLY WITH CLAMPING
AND AUXILIARY SEALING ARRANGEMENT
Filed May 15, 1959
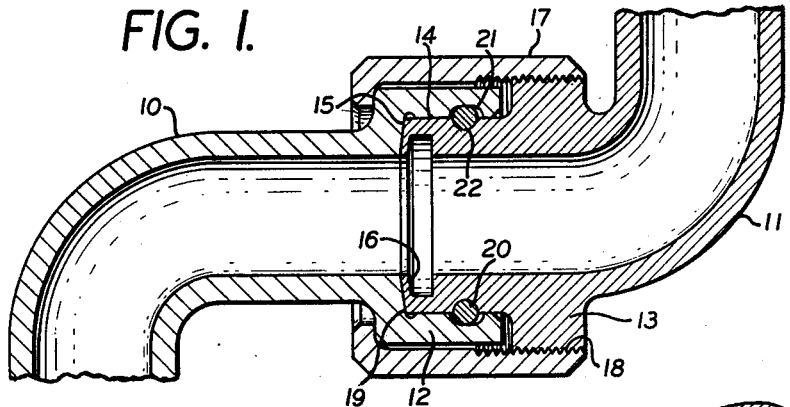
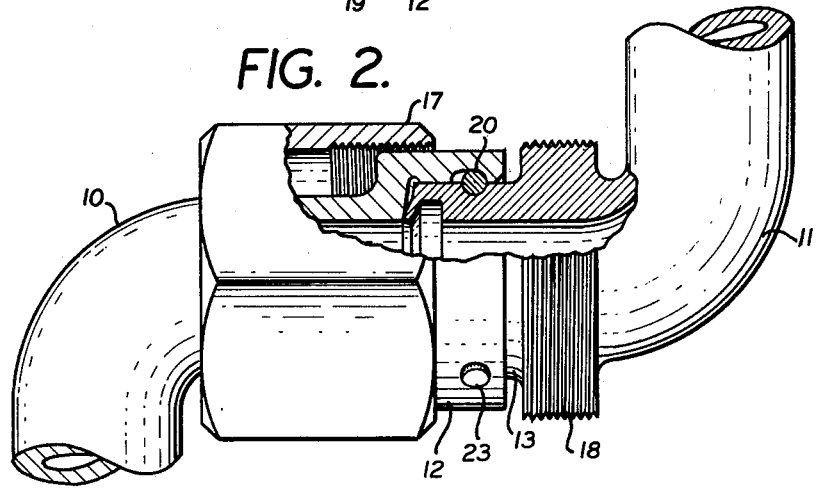
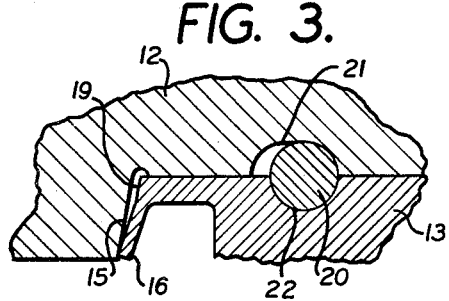
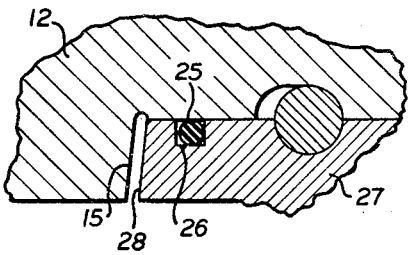
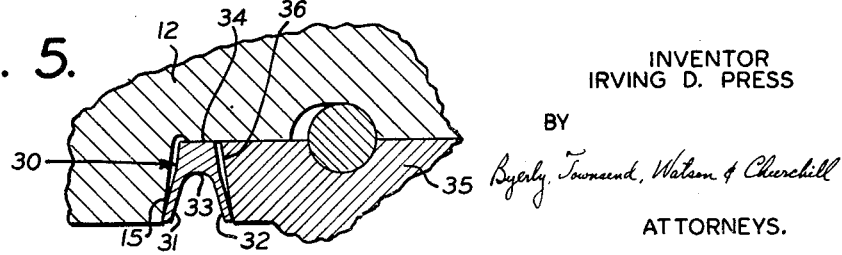
INVENTOR
IRVING D. PRESS
BY
Byerly, Townsend, Watson & Churchill
ATTORNEYS.

United States Patent Office 3,142,498
Patented July 28, 1964

3,142,498
NON-SEPARABLE SWIVEL JOINT ASSEMBLY WITH CLAMPING AND AUXILIARY SEALING ARRANGEMENT
Irving D. Press, West Orange, N.J., assignor to Resistoflex Corporation, Roseland, N.J., a corporation of New York
Filed May 15, 1959, Ser. No. 813,430
10 Claims. (Cl. 285—12)

The present invention relates to a swivel joint for interconnecting sections of a fluid conduit.

The particular swivel joint to which the present invention is directed is intended specifically, although not exclusively, for use in assembling gas connections between gas-using appliances or utilities and the supply lines. In order to understand more fully what is contemplated, consider the pipe connection that would normally connect a domestic gas range to the gas main. Conventional practice is to make a "permanent" installation which requires the gas to be shut off and pipe joints to be disconnected in order to remove the range from the wall. This can be a great inconvenience. In commercial kitchens it is of even greater concern since the ranges have to be moved frequently in order to clean behind them and so forth.

At present, flexible metal hose is being used to a limited extent where absolutely necessary. There is a great reluctance, however, to use flexible metal hose where it may be subjected to heavy-duty usage. That is, usage of the type that might require the hose to withstand frequent flexing or short radius bending or twisting or other severe stresses or strains. This is particularly true in domestic applications.

It is the purpose of the present invention to provide a swivel joint which when used with rigid conduit will provide substantially the same freedom and flexibility of movement as a flexible metal hose. At the same time, it is the purpose to provide a swivel joint which, when swiveling is not required, can be locked, clamped or tightened so as to be just as leak-proof or reliable as a conventional rigid type union.

It should be readily apparent that in order for a joint of this nature to be acceptable it must be fool-proof. It must be leak-proof when swiveling, leak-proof when "locked," and incapable of accidental dis-assembly when shifting from the locked to swiveling position. The present invention provides just such a joint.

Therefore, in accordance with the present invention a swivel joint is provided for interconnecting sections of a fluid conduit which comprises complementary swivel members each with an axial fluid passage therethrough, means joining together the swivel members in end-to-end co-axial alignment for swiveling, the means preferably permitting a limited range of axial separation of the swivel members, fluid sealing means disposed between the swivel members for establishing and maintaining a fluid-tight joint therebetween during swiveling and throughout the range of separation, if any, and means selectably clamping the swivel members against relative movement.

In accordance with a further aspect of the invention, means are provided for establishing a primary fluid seal between the swivel members when the joint is locked and for establishing and maintaining a secondary fluid seal therebetween during swiveling and throughout any range of separation.

The invention will be better understood after reading the following detailed description in connection with the appended drawings in which:

FIG. 1 is a longitudinal sectional view of a pair of elbow pieces joined together by a swivel joint constructed in accordance with the present invention and shows the parts in locked position;

FIG. 2 is a side elevation of the embodiment, shown in FIG. 1 with a portion broken away in section, and shows the parts partially dis-assembled;

FIG. 3 is an enlarged fragmentary sectional view of a detail of the embodiment shown in FIG. 2;

FIG. 4 is an enlarged fragmentary sectional view similar to FIG. 3 of a modification of the detail shown therein; and FIG. 5 is an enlarged fragmentary sectional view similar to FIG. 3 showing a further modification thereof.

Referring now to FIG. 1, the joint is illustrated as uniting a pair of elbow pieces 10 and 11. Complementary swivel members 12 and 13 are formed, respectively, upon the ends of the elbows 10 and 11. The swivel members 12 and 13 are each provided with an axial fluid passage therethrough and are arranged in telescoping engagement in end-to-end co-axial alignment as shown in the drawings. The member 12 is provided with a radially enlarged recess 14 which receives the end of the member 13 with a sliding fit. The recess 14 is provided with an annular shoulder 15 for a purpose to be described. A frusto-conical flexible metal flange 16 is formed integral with the member 13 at the end thereof. The flange 16 is designed to engage the shoulder 15 of the member 12. As will be explained more fully hereinafter, the resilient flange 16 provides a secondary seal by reason of its resilient engagement with the shoulder 15. A flanged nut or threaded union 17 is carried by the swivel member 12 and threadedly engages the threads 18 upon the swivel member 13 for clamping together the swivel members. As illustrated in FIG. 1 the nut 17 has been fully tightened such that the rigid peripheral portion 19 at the end of the swivel member 13 is in intimate engagement with the shoulder 15 on the swivel member 12 to provide a primary fluid seal. In this position of the joint, relative swiveling of the parts thereof is precluded. The resultant union is comparable to standard rigid pipe joints in use at present.

Unlike conventional structures, the present joint is provided with the flexible flange 16 previously described. In addition, the joint is provided with an annular wire or plurality of metal balls 20 nesting in a channel 21 in the swivel member 12 and in a complementary groove 22 in the swivel member 13 to lock the two swivel members against complete separation while permitting limited movement therebetween in an axial direction. The width of the channel 21 will determine the range of separation of the swivel members.

As best seen in FIG. 2, the elbow 10 is provided with a sufficiently long shank to permit rearward movement of the nut 17 until the leading edge clears the aperture 23 in the wall of the swivel member 12. The aperture 23 communicates, preferably tangentially, with the channel 21. With the flanged nut 17 in the position shown in FIG. 2, the two swivel members may be initially assembled and the annular wire or balls 20 can then be inserted through the aperture 23 into the space provided by the channel 21 and groove 22.

As previously mentioned, FIG. 1 shows the swivel joint in the locked or clamped position. When it is desired to adjust the joint, the flanged nut 17 is loosened so as to permit the limited separation of the swivel members 12 and 13 to the extent shown in detail in FIG. 3. From this figure it will be seen that engagement between the wire or balls 20 and the wall of the channel 21 functions to limit axial separation of the swivel member. The range of axial separation is selected such that the flexible flange 16 still bears against the shoulder 15 of the swivel member 12. In this manner a fluid-tight seal is maintained throughout the range of axial separation of the swivel members. In this position of the swivel members, it will be understood that the parts may be swiveled relative to each other for the purpose of adjustment. This figure also shows more clearly the rigid portion 19 which provides the primary seal when in engagement with the shoulder 15.

The present device is subject to modification as will be readily understood by those skilled in the art. For purpose of illustration, two further embodiments will now be described.

As shown in FIG. 4, the secondary seal is now provided by a resilient O-ring 25 disposed in the channel 26 formed on the peripheral surface of the swivel member 27. The flexible flange has been replaced by a rigid face 28 which confronts the shoulder 15 on the swivel member 12. It will be undertsood that the entire swivel joint is the same as that shown in FIG. 1 with the exception of the details shown in FIG. 4. As shown in FIG. 4, the parts are in the swiveling position. When the flanged nut is tightened the face 28 of the swivel member 27 will engage the shoulder 15 of the swivel member 12 to form the primary seal.

In the embodiment of FIG. 5, both the primary and secondary seals are provided by a unitary annular metal element or ring 30 with axially opposed frusto-conical flexible flanges 31 and 32 separated by a rigid body portion 33, the ring being disposed in an annular channel 34 formed between the end of the inner swivel member 35 and the shoulder 15 on the outer swivel member 12 for yielding engagement with and limited compression between the swivel members. It will be understood that the swivel member 35 is similar to the swivel member 13 in FIG. 1 with the exception that the flexible flange has been replaced in FIG. 5 by the sealing surface 36 at the end thereof.

It is contemplated that the flanged nut in each of the described embodiments may be constructed or arranged for easy manual manipulation such as by the provision of integral or removable radial spokes or the like.

From the foregoing description it should be evident that the invention provides a swivel fitting which has all the attributes of a straight union while enabling selectable leak-proof swiveling. In the preferred embodiments described, primary and secondary sealing means are provided along with two distinct coupling arrangements.

It should be understood that numerous changes may be made in the illustrative embodiments as will be apparent to those skilled in the art without departing from the true spirit of the invention as defined in the appended claims.

What is claimed is:

1. A swivel joint for interconnecting sections of a fluid conduit comprising complementary swivel members each with an axial fluid passage therethrough, means joining together said swivel members in end-to-end co-axial alignment for swiveling, said means permitting a limited range of axial separation of said swivel members, fluid sealing means disposed between said swivel members for establishing and maintaining a fluid tight joint therebetween during swiveling and throughout said range of separation, and means for clamping said swivel members together axially for preventing swiveling.

2. A swivel joint for interconnecting sections of a fluid conduit comprising complementary swivel members each with an axial fluid passage therethrough, means joining together said swivel members in end-to-end co-axial alignment for swiveling, said means permitting a limited range of axial separation of said swivel members, means for clamping said swivel members together axially for preventing swiveling, means disposed between said swivel members for establishing a primary fluid seal therebetween when said members are so clamped together, and means disposed between said swivel members for establishing and maintaining a secondary fluid seal therebetween during swiveling and throughout said range of separation.

3. A swivel joint for interconnecting sections of a fluid conduit comprising complementary swivel members each with an axial fluid passage therethrough arranged in telescoping engagement in end-to-end co-axial alignment for swiveling, means cooperating with both of said swivel members for preventing axial separation of said swivel members beyond a limited range, fluid sealing means disposed between said swivel members for establishing and maintaining a fluid tight joint therebetween during swiveling and throughout said range of separation, and means for clamping said swivel members together axially for preventing swiveling.

4. A swivel joint according to claim 3, wherein said fluid sealing means comprises an annular metal element with axially opposed frusto-conical flexible flanges separated by a rigid body portion, said metal element being disposed in an annular channel formed between the end of the inner swivel member and a shoulder on the outer swivel member for yielding engagement with and restricted compression between said swivel members.

5. A swivel joint for interconnecting sections of a fluid conduit comprising complementary swivel members each with an axial fluid passage therethrough arranged in telescoping engagement in end-to-end co-axial alignment for swiveling, means cooperating with both of said swivel members for preventing axial separation of said swivel members beyond a limited range, means for clamping said swivel members together axially for preventing swiveling, means disposed between said swivel members for establishing a primary fluid seal therebetween when said members are so clamped together, and means disposed between said swivel members for establishing and maintaining a secondary fluid seal therebetween during swiveling and throughout said range of separation.

6. A swivel joint according to claim 5, wherein said means for establishing a primary fluid seal comprises confronting annular metal sealing surfaces on said swivel members which engage upon axial movement of said swivel members towards each other.

7. A swivel joint according to claim 6, wherein said means for establishing and maintaining a secondary fluid seal comprises an O-ring packing member disposed between the telescoped surfaces of said swivel members.

8. A swivel joint according to claim 6, wherein said means for establishing and maintaining a secondary fluid seal comprises a frusto-conical flexible metal flange formed integral with one of said swivel members and yieldingly engaging the other swivel member.

9. A swivel joint for interconnecting sections of a fluid conduit comprising complementary swivel members each with an axial fluid passage therethrough, means securing said swivel members in end-to-end co-axial alignment for swiveling, means for selectably clamping said swivel members against all relative movement, means disposed between said swivel members for establishing a primary fluid seal therebetween only when said members are clamped and means disposed between said swivel members for establishing and maintaining a secondary fluid seal therebetween at all times.

10. A swivel joint for interconnecting sections of a fluid conduit comprising complementary swivel members each with an axial fluid passage therethrough arranged in telescoping engagement in end-to-end co-axial alignment for swiveling, a confronting annular channel and groove formed in the telescoped surfaces of said swivel members, one on each member, so as to provide an annular chamber therebetween, the channel having a slightly greater axial dimension than the groove, means disposed in said chamber and cooperating with said channel and groove for preventing axial separation of said swivel members beyond a limited range, confronting annular metal sealing surfaces on said swivel members which engage upon axial movement of said swivel members toward each other for establishing a primary fluid seal therebetween, means for clamping together in an axial direction said swivel members against axial separation for preventing swiveling and establishing said primary fluid seal, and means disposed between said swivel members for establishing and maintaining a secondary fluid seal therebetween during swiveling and throughout said range of separation.

References Cited in the file of this patent

UNITED STATES PATENTS

| | | |
|---|---|---|
| 1,339,636 | Tulloch | May 11, 1920 |
| 1,994,007 | Tallant et al. | Mar. 12, 1935 |
| 2,239,942 | Stone | Apr. 29, 1941 |
| 2,273,017 | Boynton | Feb. 17, 1942 |
| 2,305,524 | Frazier-Nash | Dec. 15, 1942 |
| 2,486,451 | Warren | Nov. 1, 1949 |
| 2,525,799 | Hecker | Oct. 17, 1950 |
| 2,543,311 | Augspurger et al. | Feb. 27, 1951 |
| 2,587,938 | Warren | Mar. 4, 1952 |
| 2,597,482 | Harrison | May 20, 1952 |
| 2,751,767 | Hedden | June 26, 1956 |
| 2,789,847 | Jackson | Apr. 23, 1957 |
| 2,912,262 | Franck | Nov. 10, 1959 |

FOREIGN PATENTS

| | | |
|---|---|---|
| 307,101 | Great Britain | Mar. 4, 1929 |
| 507,008 | Germany | Sept. 11, 1930 |
| 1,098,480 | France | Mar. 2, 1955 |